(12) United States Patent
Dillon et al.

(10) Patent No.: US 8,956,147 B2
(45) Date of Patent: Feb. 17, 2015

(54) MOLD FOR RECTANGULAR STRUCTURE

(75) Inventors: Craig T. Dillon, Royal Oak, MI (US); Andrew R. Romano, Royal Oak, MI (US)

(73) Assignee: The Ohorizons Foundation, Troy, MI (US)

( * ) Notice: Subject to any disclaimer, the term of this patent is extended or adjusted under 35 U.S.C. 154(b) by 483 days.

(21) Appl. No.: 13/301,905

(22) Filed: Nov. 22, 2011

(65) Prior Publication Data

US 2013/0127088 A1   May 23, 2013

(51) Int. Cl.
B41B 11/54 (2006.01)
B29C 33/00 (2006.01)

(52) U.S. Cl.
CPC ............... *B29C 33/00* (2013.01); *B41B 11/54* (2013.01)
USPC ........................... 425/438; 249/163; 249/180

(58) Field of Classification Search
CPC ................ B29C 33/485; B29C 33/48; B29C 2043/5023; B41B 11/54
USPC ............. 425/DIG. 5, 438; 249/142, 178, 180, 249/163
See application file for complete search history.

(56) References Cited

U.S. PATENT DOCUMENTS

| | | | |
|---|---|---|---|
| 950,827 A * | 3/1910 | Smith | 249/185 |
| 3,669,402 A | 6/1972 | Paulson | |
| 3,952,990 A | 4/1976 | Garcia | |
| 4,063,859 A | 12/1977 | Halle et al. | |
| 4,300,746 A * | 11/1981 | Schoen | 249/13 |
| 4,471,936 A | 9/1984 | Bondpers | |
| 4,614,326 A | 9/1986 | Strickland et al. | |
| 4,846,438 A | 7/1989 | Lee | |
| 5,788,874 A * | 8/1998 | Tucker, Jr. | 249/180 |
| 6,105,924 A | 8/2000 | Carr | |
| 7,140,867 B2 | 11/2006 | Scherer et al. | |
| 7,549,616 B1 | 6/2009 | Koren | |
| 7,695,268 B2 | 4/2010 | Klettenberg | |

* cited by examiner

*Primary Examiner* — Yogendra Gupta
*Assistant Examiner* — Kimberly A Stewart
(74) *Attorney, Agent, or Firm* — Bejin Bieneman PLC

(57) ABSTRACT

An inner mold body includes a first pair of side walls opposite one another, each of the first pair of side walls having a pair of engagement members attached thereto, a second pair of side walls opposite one another; wherein each of the second pair of side walls is adjacent to each of the first pair of side walls, and a separation mechanism in contact with each of the second pair of side walls.

15 Claims, 7 Drawing Sheets

MOLD FOR RECTANGULAR STRUCTURE

BACKGROUND INFORMATION

Much of the world's population lacks access to potable water. Filtration devices can be made from a variety of materials. One useful material for making water filters is concrete. A rectangular concrete water filter, filled with sand and gravel, can be used to create an anaerobic environment that both filters particles from contaminated water, as well as kills pathogens.

However, concrete is heavy and therefore difficult and expensive, if not impractical, to transport. Further, molds that would allow concrete to be poured in remote locations for making water filters are also difficult to transport and/or are generally complicated to assemble and use. Such molds are generally made from heavy and expensive materials such as steel, limiting the ability to provide water filters, or the materials to make water filters, to economically disadvantaged regions, remote locations, and other areas lacking potable water.

DETAILED DESCRIPTION OF PREFERRED EMBODIMENTS

Figure 1:
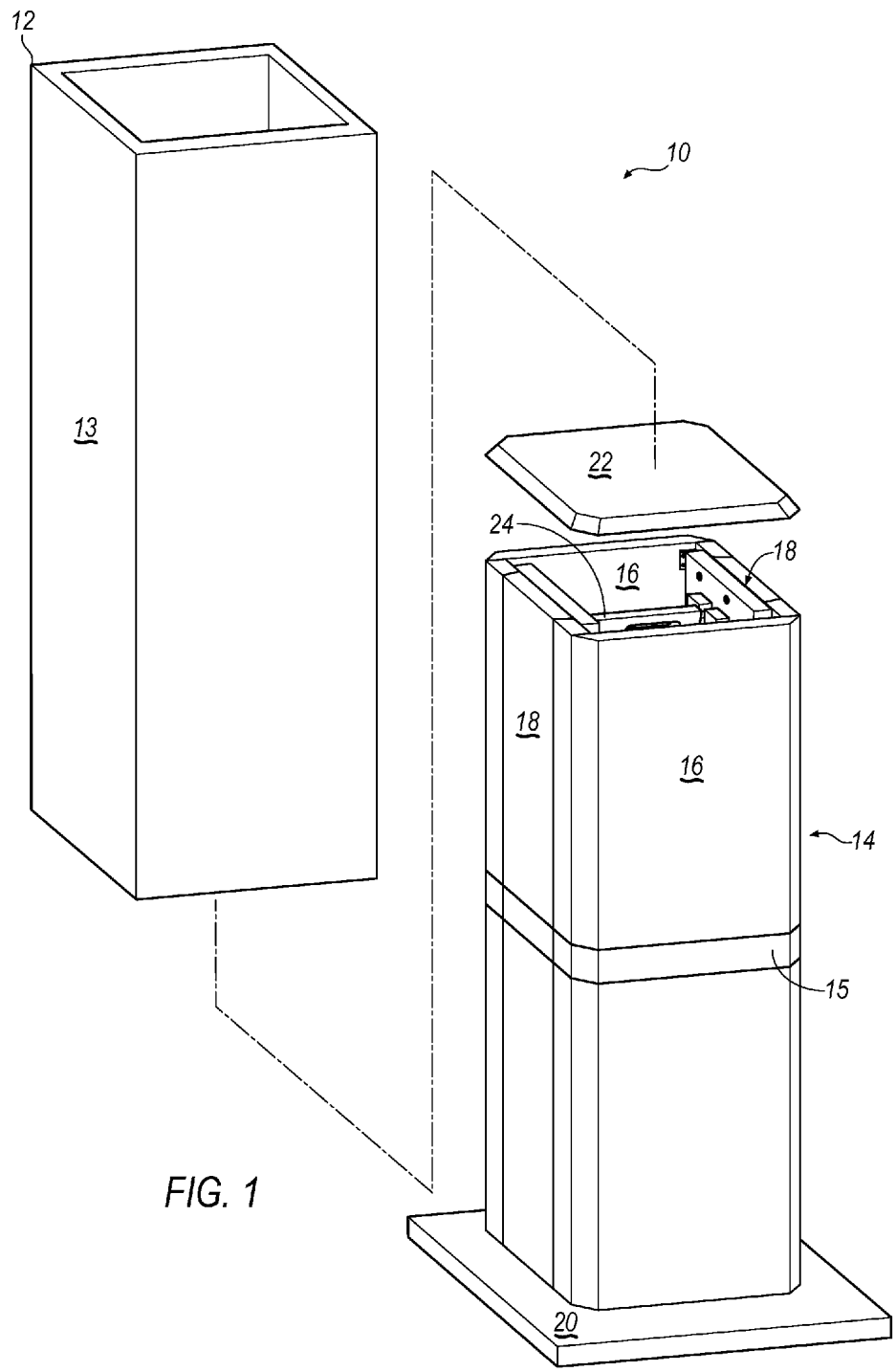
FIG. 1 provides an exemplary perspective view of a mold.
Figure 2:
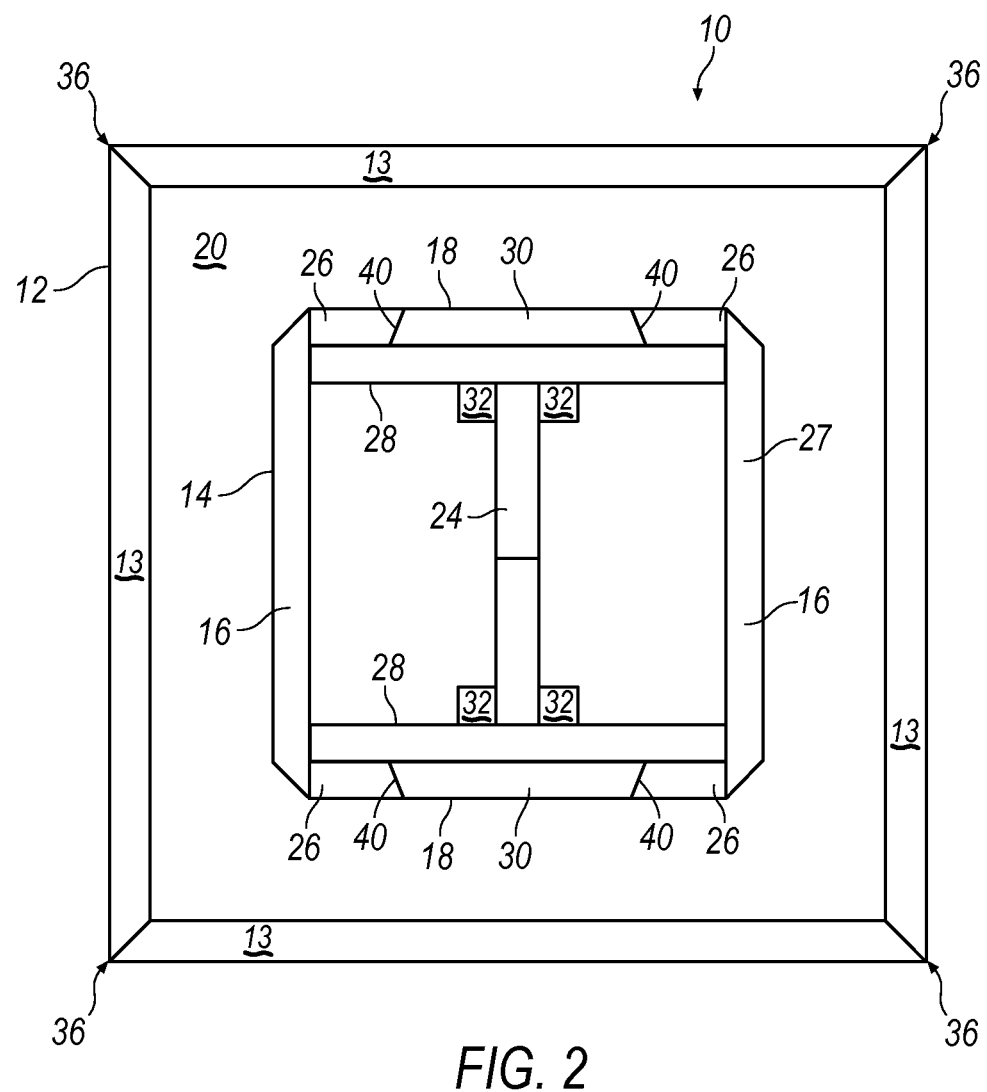
FIG. 2 provides an exemplary cross-sectional view of the mold of FIG. 1.

FIG. 1 illustrates a perspective view, and FIG. 2 illustrates a cross-sectional view, of an exemplary mold 10, including an outer body 12, an inner body 14. As seen in FIG. 1, a cap 22 is generally provided to be fitted over the inner body 14. When the outer body 12 is placed around the inner body 14, and the cap 22 is in place, the mold 10 may be used, e.g., for pouring and curing concrete or the like.

The outer body 12 is generally formed by four generally rectangular walls 13 connected together so that a cross-section of the outer body 12 is rectangular, preferably square or approximately square. In one example, the walls 13 are each approximately thirty-six inches long by approximately sixteen inches wide. Further, the walls 13 in this example are approximately ¾ inch thick, and in general walls 13 are preferably in a range of ⅜ to 1 inch thick. The walls 13 generally have sides cut at angles 36 of about forty-five degrees) (45°) to allow the walls 13 to be joined together to form a rectangular cross-section. Mechanisms used for fastening the walls 13 to one another may include various screws, or other fastening mechanisms. Walls 16 are generally made from laminated particle board, e.g., such as may be purchased from many retail lumberyards or the like. Laminated plywood may also be used, and use of marine grade plywood generally will result in improved production life of the mold 10 at only a marginally higher construction cost. In general, the mold 10 is preferably made from materials that are relatively lightweight and easy to transport.

The inner body 14 includes sidewalls 16 and 18, held in place by one or more straps 15 during assembly, afterwards held in place by friction, and rests on a base 20. A dagger board 24 is disposed within the interior of the inner body 14. The inner body 14 may be attached to the base 20 using screws, adhesives, and/or other fastening mechanisms. The dimensions of the base 20 are generally slightly larger than the dimensions of a cross-sectional shape, e.g., square, formed by the outer body 12 so as to allow the outer body 12 to rest on the base 20 when the outer body 12 is placed around the inner body 14, e.g., when concrete is being poured.

Figure 3A:
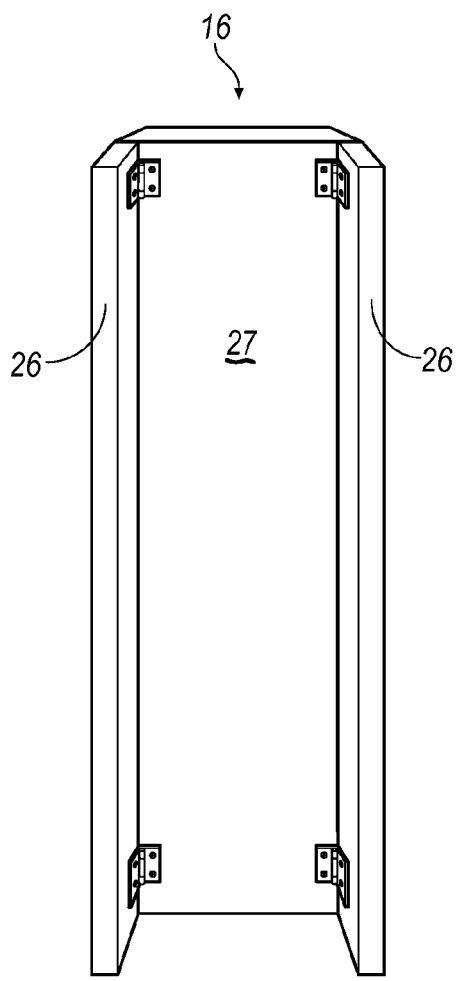
FIGS. 3A and 3B provide perspective views of inner body walls of the mold of FIG. 1.
Figure 3B:
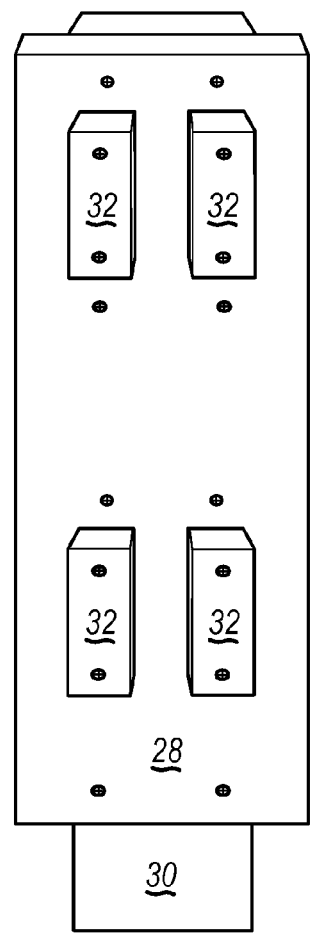
Figure 4D:
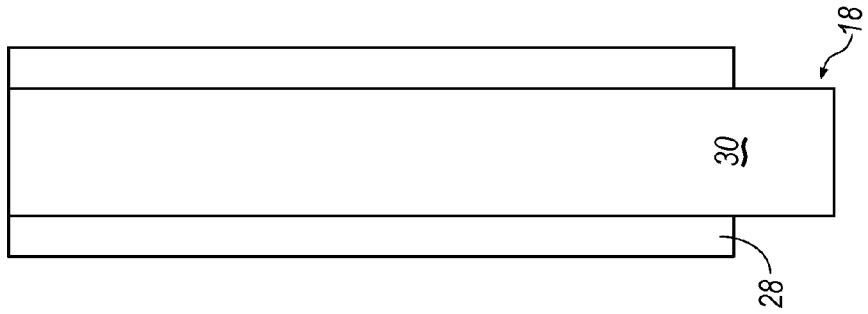
FIGS. 4A, 4B, 4C, and 4D provide side views of sidewalls of an inner body of the mold of FIG. 1.
Figure 4C:
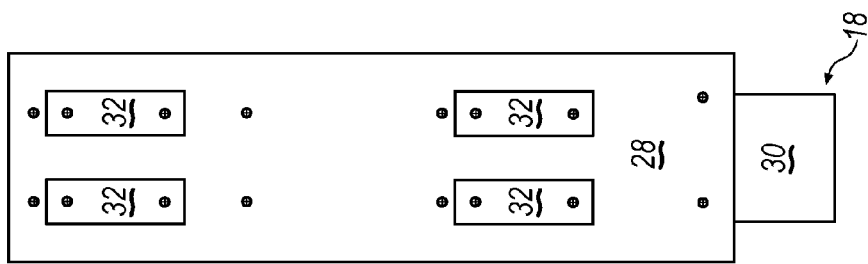
Figure 4B:
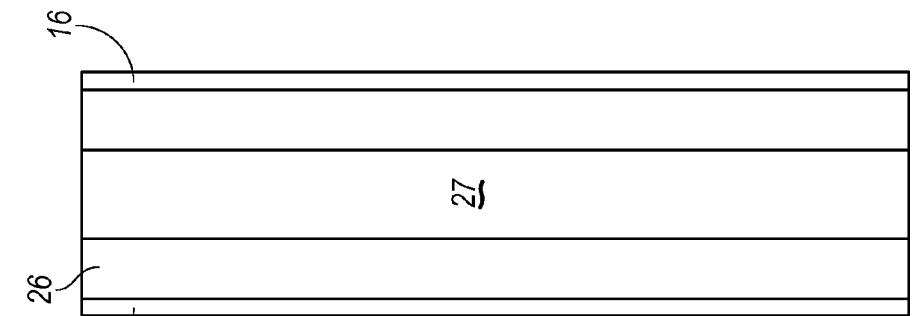
Figure 4A:
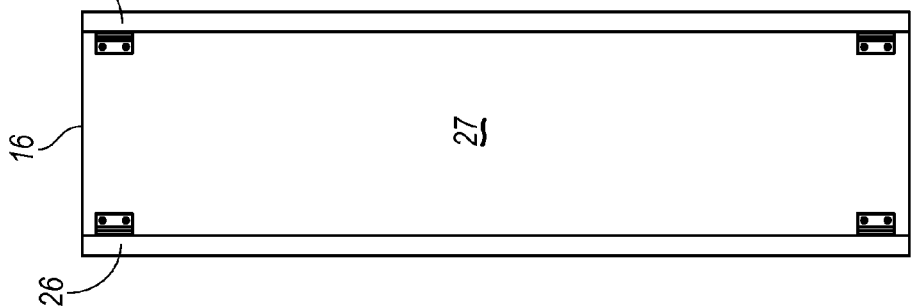

FIGS. 3A and 3B provide perspective views of the inner body 14 walls 16 and 18. FIGS. 4A and 4B provide side views of an inner body 14 side wall 16, and FIGS. 4C and 4D provide a side views of an inner body 14 side wall 18.

Wall 16 includes two engagement members 26 attached, e.g., using hinges or the like, to a main member 27. As seen in FIG. 3A, the engagement members 26, at an open position, extend perpendicularly or approximately perpendicularly from the main member 27. FIG. 4A shows the engagement members 26 in an open position, sometimes referred to as an engaged position. FIG. 4B shows the engagement members 26 in a closed, or relaxed, position. As discussed further below, the engagement members 26 may be in an engaged position when concrete is poured into, and is curing and, the mold 10. Further, the engagement members 26 may be relaxed so that the inner body 14 may be removed from a concrete structure once the concrete structure has cured in the mold 10. Hinging the engagement members 26 generally allows improved production life of the mold 10 and reduces the possibility of the inner body 14 being difficult to release after concrete poured into the mold 10 has cured. However, that implementations that omit a hinge and any hinge-like elements are possible. In such implementations, the engagement members could be glued, screwed, or otherwise attached, to the main member 27 as shown in FIG. 3A, and would remain in the open position shown, e.g., in FIGS. 3A, 4A, and 5A, and would not moved toward a relaxed position as shown in FIGS. 4B and 5B.

The walls 16 and 18 are generally of a thickness the same as or similar to the thickness of walls 13, discussed above. Further, dimensions of the members 26 and 27 may vary, e.g., to continue the example discussed above, the members 26 and 27 may each be approximately 32-34 inches long, e.g., thirty-three and five-eights inches long. Further, the member 27 may be 8-10 inches wide, e.g., eight and five-eighths inches. The members 26 may each be 1.125-2.0 inches wide, e.g., 1.25 inches.

As seen in various figures, members 27 may have beveled edges meeting the sides of engagement members 26. Bevels in the edges of the members 27 are optional, but provide the benefit of allowing the side walls 16 to release more cleanly, quickly, and/or easily from a cured concrete structure formed in the mold 10.

As shown in FIGS. 3B, 4C, and 4D, wall 18 includes an inner member 28 and an outer member 30. The wall 18 also may include guides 32 for positioning the dagger board 24, as discussed further below. The members 28 and 30 may be mounted onto one another with their respective centerlines aligned or substantially aligned, and the guides 32 may be mounted on the member 28, via screws, adhesives, or some other suitable fastening mechanism.

The outer member 30 is generally of a length that is similar to the lengths of members 26 and 27. The inner member 28 is generally shorter than the outer member 30 by a certain amount, e.g., four inches. As can be seen in FIGS. 1, 2, and 5, a top edge of the inner member 28 is generally mounted substantially flush with a top edge of the outer member 30 such that the sum of the width of two members 26 and one member 30 is approximately the same as the overall width of one member 27, resulting in an approximately square shape of the inner body 14. Further; member 28 is constructed in such a way that its width is less than the sum of the two members 26 and member 30 so that any compression from external forces (e.g. concrete curing/or pouring) is transmitted to engagement members 26 and outer member 30 externally, rather than 28 inner member 28 transmitting force to outer member 30, which could allow uncured concrete to leak into the interior of the inner body 14, which could make disassembly of the inner body 14 more difficult.

The width of the outer member 30 is determined by the widths of the members 26 with which the outer member 30 is fitted. For example, if the members 26 are each about 1.125 inches wide, then the outer member 30 should be about 5.5 inches wide.

The inner member 28 is generally wider than the outer member 30, the outer member 30 generally being mounted in the center, or a long a dividing line, of the inner member 28. For example, if the outer member 30 is 5.5 inches wide, then the inner member 28 may be 7.875 inches wide.

As best seen in FIG. 2, outer member 30 of side wall 18 and members 26 of side wall 18 are angled in a complementary manner so that the members 30 and 26 may about each other at a seam 40, whereby the members 26 in a closed position secure the side wall 18. In one embodiment, the sides of the members 26 and 30 are angled at or about ten degrees (10°). Thus, when viewed in cross-section as in FIG. 2, outer member 30 is a trapezoid, with the longer face of the trapezoid being the face that abuts inner member 28.

Figure 5A:
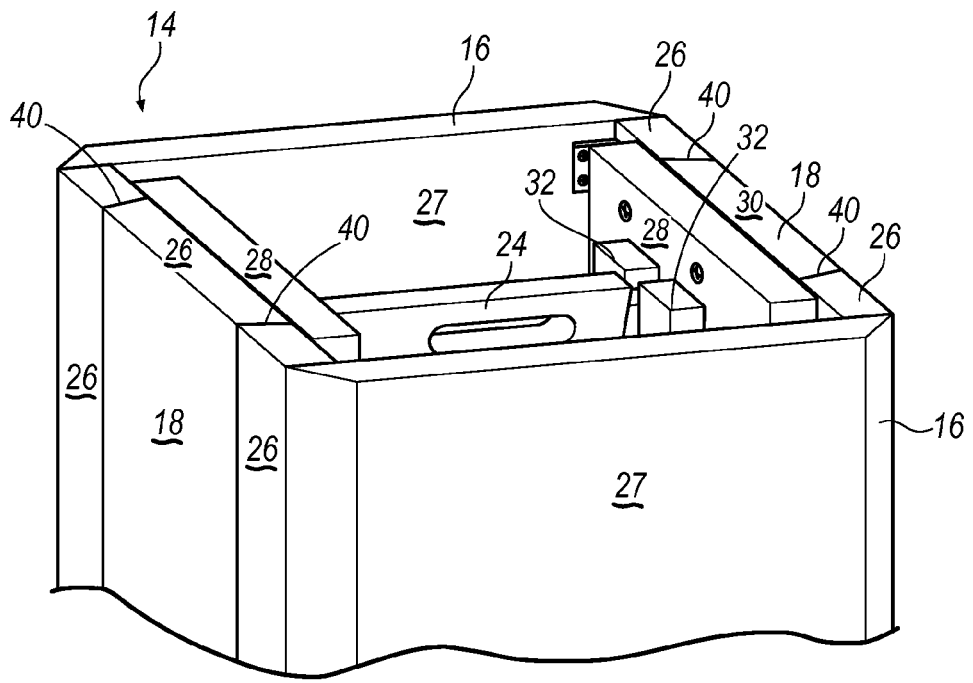
FIG. 5A provides an exemplary perspective view of an upper portion of the inner body of the mold of FIG. 1 with the side walls of the inner body secured in place.
Figure 5B:
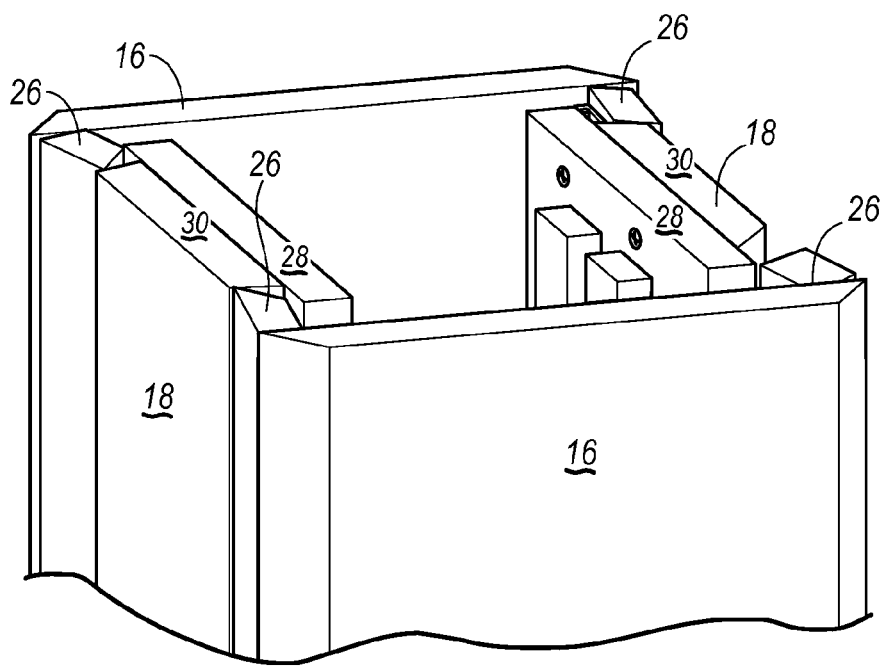
FIG. 5B provides an exemplary perspective view of an upper portion of the inner body of the mold of FIG. 1 with a dagger board removed and side walls collapsed.

FIG. 5A provides an exemplary perspective view of an upper portion of the inner body 14 with the side walls 16 and 18 secured in place, where the members 26 of walls 16 respectively abutting outer members 30 of walls 18 at seams 40, as discussed above, and also abutting, on inner faces of the respective walls 26, respective outer faces of inner members 28 of walls 18. Dagger board 24, held in place by guides 32, prevents members 26 from moving toward a closed position, and the side walls 18 from moving toward one another. Alternatively, guides 32 could be omitted, and the dagger board 24 could be held in place by friction. In any case, the dagger board 24 is generally situated between the members 26. Further other separation mechanisms could be used in place of the dagger board 24 to separate the members 26, preferably a mechanism such as a four-bar rocker or the like that would allow the members 26 to be relaxed to a closed position once concrete poured into the mold 10 had cured.

Side walls 18, by abutting members 26, in turn prevent side walls 16 from collapsing toward one another. Inner body 14, once arranged as shown, e.g., in FIGS. 1, and 5A, may be secured by various mechanisms, e.g., one or more straps 15, e.g., cloth or metal bands, etc., may be placed around the outer surfaces of the inner body 14 during assembly to support the inner core. The straps 15, if used, are generally removed before concrete is poured into the mold 10.

FIG. 5B provides an exemplary perspective view of an upper portion of the inner body 14 with the dagger board 24 removed. As is shown, in the absence of the dagger board 24 bracing apart side walls 18, side walls 18 can be collapsed toward one another, whereby members 26 of side walls 16 collapse to a closed or disengaged position. Further, as side walls 18 are collapsed toward one another, or removed from the interior of a concrete structure, side walls 16 may likewise be collapsed toward one another for removal from the concrete structure.

Figures 6A, 6B:
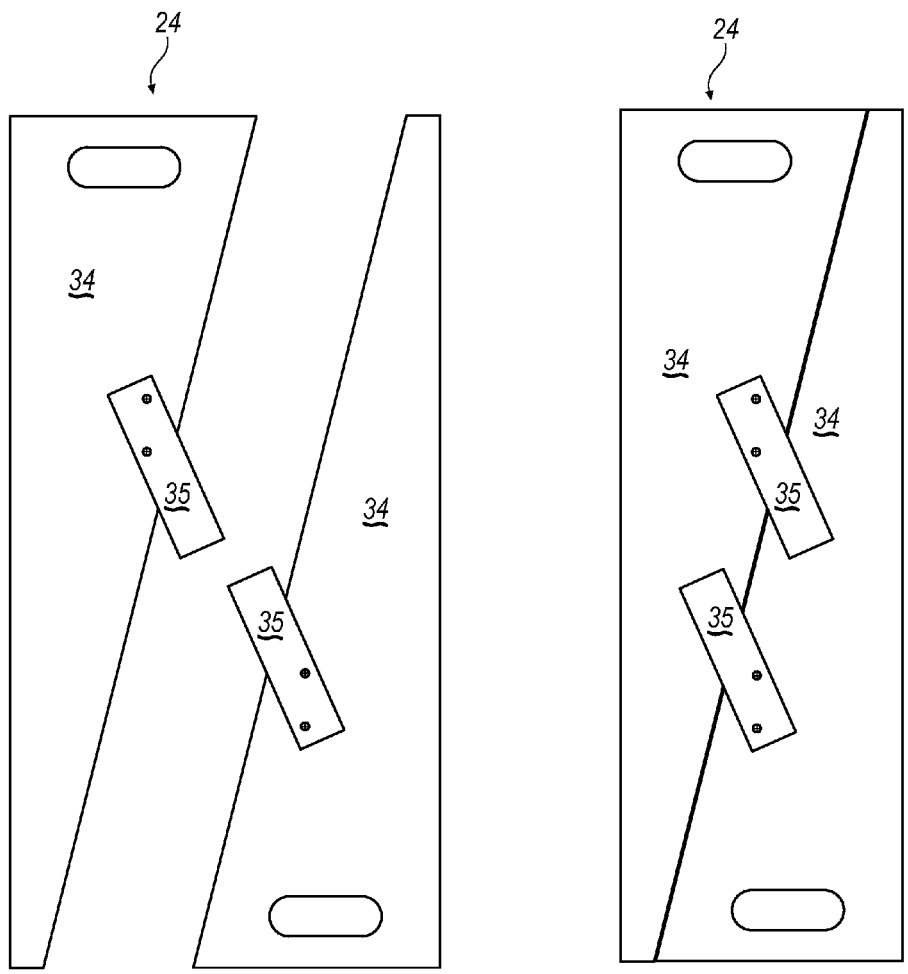
FIGS. 6A and 6B provide a side views of an exemplary dagger board for the mold of FIG. 1.

FIG. 6A illustrates a side view of sections 34 an exemplary dagger board 24, although it is to be understood that dagger board 24 could be a single substantially rectangular piece, instead of two substantially triangular sections 34 that are mated to form dagger board 24. For example, a single-piece dagger board 24 could be used in cases where guides 32 are omitted. Further, as mentioned above, other mechanisms, such as a four-bar rocker, could be used in place of the dagger board 24. The split (two piece) dagger board 24 allows a rapid release of compressive stresses on the center core while the concrete cures and reduces the possibility of dagger board being trapped if members 18 or 16 become misaligned while concrete poured into the mold 10 is curing. Dagger board 24 sections 34 generally have a length about the same as the length of members 28 of side wall 18. Two holding members are affixed to respective sides of dagger board 24 pieces 34, e.g., via screws or the like. Only one holding member 35 is visible as mounted on each section 34 as seen in FIG. 6 because the other holding member 35 for each section 34 is obscured by the visible holding member 35. The holding members 35 slightly engage and hold in place, by friction, the sections 34, that when placed together as shown in FIG. 6B, form a single dagger board 24.

Figure 7:
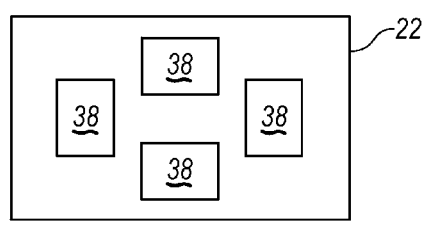
FIG. 7 provides a bottom view of an exemplary cap for the inner body of the mold of FIG. 1.

FIG. 7 illustrates an example of a bottom face of the cap 22, including four guides 38 arranged so that the cap 22 may be placed on the inner body 14, the guides 38 serving to properly locate and hold in place the cap 22 with respect to the side walls 16 and 18 of the inner body 14. Accordingly, dimensions of the cap 22, and the placement of guides 38, are determined according to dimensions and the arrangements of side walls 16 and 18.

Figure 8:
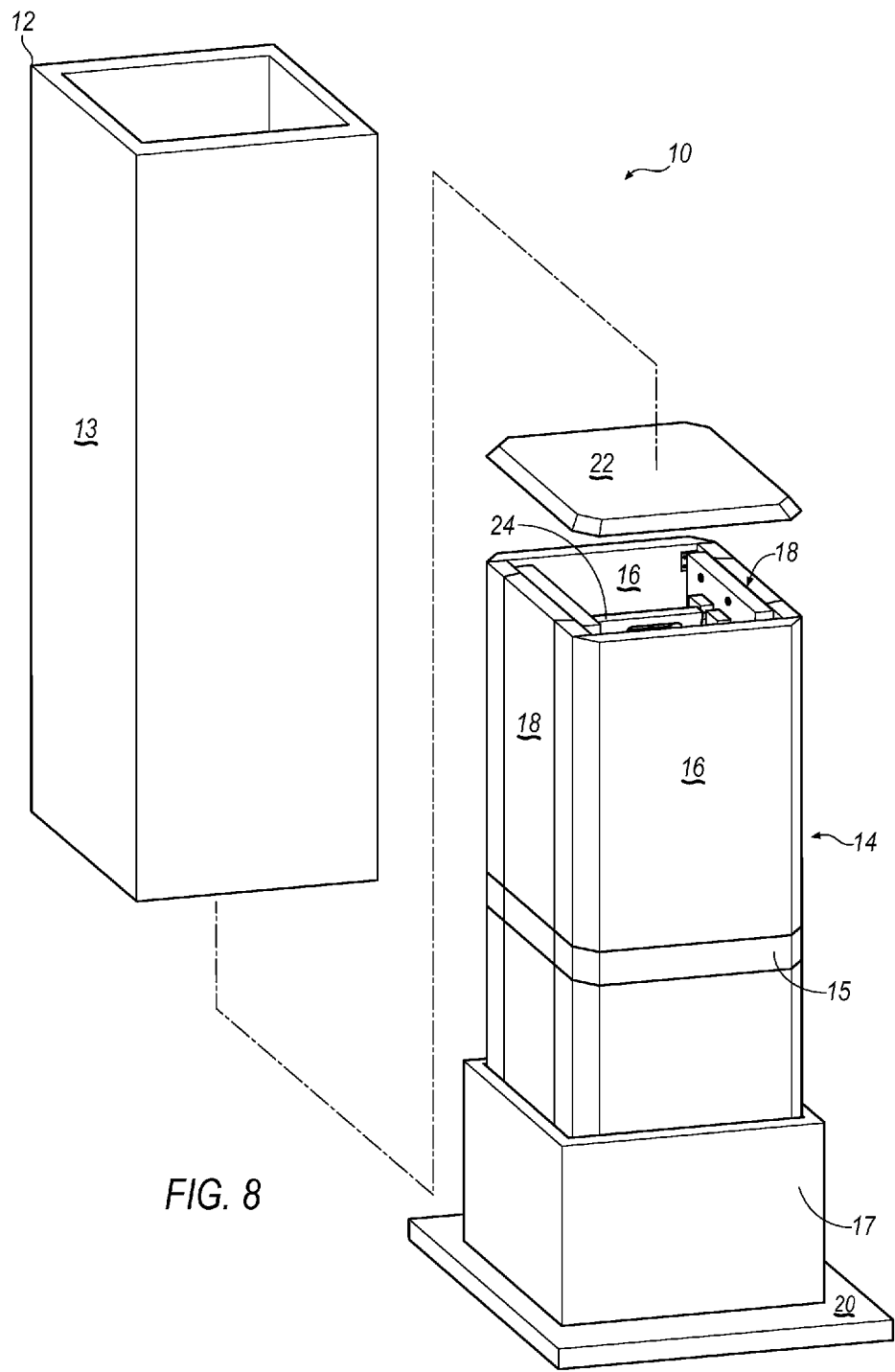
FIG. 8 illustrates an alternative implementation of the mold of FIG. 1.

FIG. 8 illustrates an alternate implementation of the mold 10 of FIG. 1. As seen in FIG. 8, a sleeve 17 may rest on the base 20, and may be affixed thereto, e.g., using screws or the like. The inner body 14, once assembled, may be placed in the sleeve 17. The purpose of the sleeve 17 is to allow for creation of a ledge or step in the interior walls of a concrete structure created using the mold 10. This ledge may be used to retain and/or support a screen, sieve, or other structure on which gravel, metal chunks, nails, etc. may be placed. Such a ledge may thereby provide for a diffuser or some other pre-treatment mechanism to be used in a concrete biosand filter made using the mold 10. Generally, the sleeve 17 should be constructed in such a fashion that it will fit snugly around the inner body 14, i.e., friction should hold the nearby 14 in place in the sleeve 17, but it should be possible to lift the inner body 14 from the sleeve 17, or to lift the base 20 with the attached sleeve 17 from the inner body 14 after turning the inner body 14 upside-down. The height of the sleeve 17 may be varied for various applications, but in many implementations the sleeve 17 extends approximately 6 inches from the base 20.

The mold 10, in addition to being generally made of lightweight, relatively easily transported materials, is also generally relatively easy to assemble and use. A process by which the mold 10 may be used is as follows. The mold 10 may be assembled generally as shown in FIG. 1, with the cap 22 placed on the inner body 14 as described above. Then, the outer body 12 may be placed on the base 20 such that the outer body 12 is around the inner body 14. FIG. 2 provides a cross-sectional view of the resulting arrangement, except that the cap 22 is not shown. Next, concrete may be poured into the mold 10, and allowed to cure. Once the concrete is cured, the cap 22, and then the dagger board 24, may be removed from the inner body 14, whereupon the inner body 14 may be collapsed, e.g., as shown in, and described above with respect to, FIG. 5B. Side walls 16 and 18 of the inner body 14 may then be removed from the interior of the concrete structure formed by the mold 10. Further, the outer body 12 may be removed, leaving a concrete structure that may be used for a desired purpose, e.g., as a water filter. Concrete contracts during curing, further facilitating the removal of the outer body 12 and the inner body 14 from the concrete structure.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A mold, comprising:
    an inner body that includes:
    a first pair of side walls, each of the side walls having first and second sides that extend for a length;
    a pair of engagement members, each of the engagement members extending for the length of the side walls attached to one of the side walls by at least one hinge;
    a second pair of side walls; and
    a separation mechanism extending for the length and situated between the second pair of side walls;
    wherein each of the engagement members engages and secures one of the second pair of side walls, and wherein the separation mechanism prevents the second pair of side walls from collapsing toward one another.

2. The mold of claim 1, further comprising a cap configured to cover the inner body.

3. The mold of claim 1, further comprising an outer body that includes four generally planar walls arranged to fit around the inner body, leaving space for concrete to be poured.

4. The mold of claim 3, further comprising a base, wherein the outer body and the inner body rest on the base.

5. The mold of claim 1, wherein the separation mechanism forms a rectangular solid.

6. The mold of claim 1, wherein each of the engagement members engages and secures one of the second pair of side walls in part based on sides of the engagement members abutting sides of the second pair of side walls at a first angle and a second angle, respectively.

7. The mold of claim 1, the second pair of side walls including an inner member and an outer member.

8. The mold of claim 1, wherein the at least one hinge attaching each engagement member to a respective one of the first side walls includes a plurality of hinges disposed along the length.

9. A mold, comprising:
    a first pair of side walls, each of the first pair of side walls having a pair of engagement members attached thereto, each of the engagement members having sides formed at a first angle, the first angle being one of acute and obtuse; wherein each of the first pair of side walls and each of the first pair of engagement members extend for a length;
    a second pair of side walls extending for the length, each of the second pair of side walls having sides formed at a second angle complementary to the first angle such that the second angle is acute if the first angle is obtuse, and obtuse if the first angle is acute; and
    a separation mechanism in contact with each of the second pair of side walls to the extent of the length;
    wherein each of the engagement members engages and secures one of the second pair of side walls in part based on sides of the first pair of side walls abutting sides of the second pair of side walls according to the first angle and the second angle.

10. The mold of claim 9, wherein the separation mechanism is a rectangular solid that prevents the second pair of side walls from collapsing toward one another.

11. The mold of claim 9, further comprising an outer body that includes four generally planar walls arranged to fit around an inner body, leaving space for concrete to be poured.

12. The mold of claim 11, further comprising a base, wherein the outer body and the inner body rest on the base.

13. The mold of claim 10, wherein the separation mechanism includes two mated sections.

14. The mold of claim 9, the second pair of side walls including an inner member and an outer member, wherein each side of the outer member includes the second angle.

15. The mold of claim 9, wherein the separation mechanism is held in place by guides affixed to each of the second pair of side walls.

* * * * *